United States Patent [19]

Rüter

[11] 4,426,565
[45] Jan. 17, 1984

[54] APPARATUS FOR MEASURING THE TRAVEL SPEED OF AUTOMATIC WELDING MACHINES

[75] Inventor: Franz Rüter, Oberhausen, Fed. Rep. of Germany

[73] Assignee: M.A.N. Maschinenfabrik Augsburg-Nürnberg A.G., Fed. Rep. of Germany

[21] Appl. No.: 272,392

[22] Filed: Jun. 10, 1981

[30] Foreign Application Priority Data

Jun. 10, 1980 [DE] Fed. Rep. of Germany ....... 3021659

[51] Int. Cl.³ .............................................. B23K 9/10
[52] U.S. Cl. .......................... 219/130.01; 219/124.34; 324/175
[58] Field of Search ...................... 219/124.34, 124.22, 219/137.71, 130.01, 130.21; 324/175, 166

[56] References Cited

U.S. PATENT DOCUMENTS

| | | | |
|---|---|---|---|
| 2,719,899 | 10/1955 | Schwarting | 219/124.22 |
| 3,509,314 | 4/1970 | Freytag | 219/137.71 |
| 3,626,146 | 12/1971 | Smith | 219/130.21 |
| 3,675,199 | 7/1972 | Jamison et al. | 324/175 |
| 3,780,297 | 12/1973 | Geary | 324/175 |
| 3,814,934 | 6/1974 | Mesh et al. | 324/175 |
| 4,227,150 | 10/1980 | Widl | 324/175 |

FOREIGN PATENT DOCUMENTS 1196230 6/1970 United Kingdom ................ 324/175

*Primary Examiner*—C. C. Shaw
*Attorney, Agent, or Firm*—McGlew and Tuttle

[57] ABSTRACT

A method and apparatus for controlling the travel speed of automatic welding machines uses a rotatable member which is engaged with the workpiece as the workpiece is moved relative to the welding head. The rotatable member advantageously includes one or more apertures on one side of which light is directed and the opposite side of which light pulses are received during rotation of the member and these pulses are used as an indication of the speed of the welding machine. In the preferred apparatus a separate frictional member is frictionally engaged with the workpiece and moved by the movement of the workpiece relative to the welding head and through suitable gearing drives the rotatable member having the aperture. Light is transmitted to one side of the rotatable member preferably from a light source through optical fibers and is picked up on the opposite side by similar optical fiber elements which transmit the pulse signals to a sensor for the purpose of giving a digital or other reading in respect to the speed involved.

2 Claims, 5 Drawing Figures

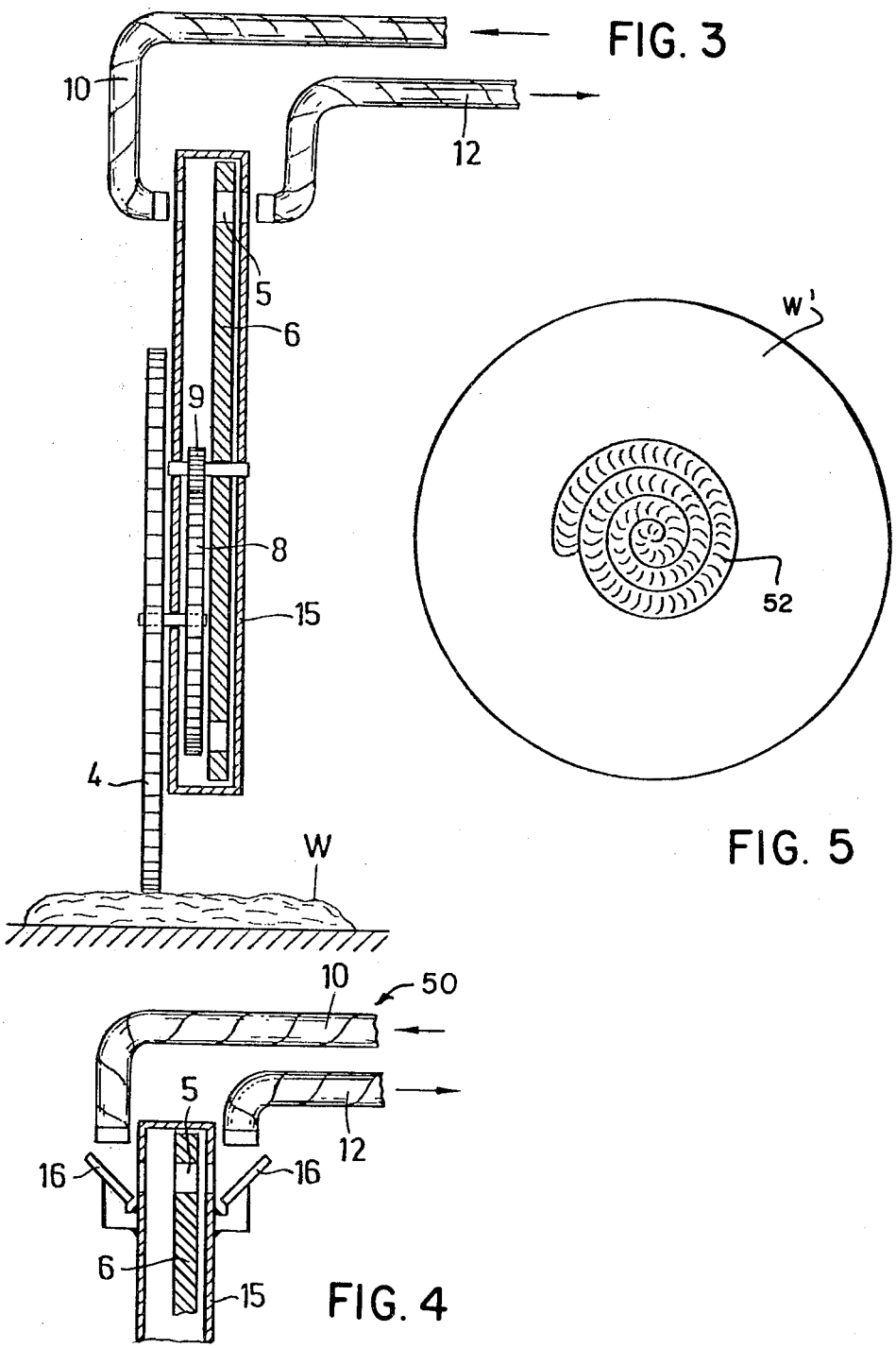

4,426,565

APPARATUS FOR MEASURING THE TRAVEL SPEED OF AUTOMATIC WELDING MACHINES

FIELD AND BACKGROUND OF THE INVENTION

This invention relates in general to welding machines and in particular to a new and useful device for sensing the travel speed of automatic welding machines and to a method of effecting the measurement.

The travel speed of the welding head of automatic welding machines depends on a number of parameters, such as the thickness of the welding seam to be produced, the welded and filler material, the welding electrode, and the voltage and current used. As a rule, however, the travel speed of the welding head is to be constant during the process of producing the welding seam. With straight-line welding seams, no difficulties arise, since a constant travel speed can be adjusted on the automatic welding machine.

Automatic welding machines, however, are also employed for producing welding seams which do not follow a straight line, but a curve. If, for example, surfacing of circular areas is concerned, where the welding beads follow a spiral, or if a welding seam is produced by spirally superimposing beads so that upon every full revolution the ring thus formed has a larger diameter, then, with a constant travel speed of the welding head, the relative speed between the welding head and the welded work varies continuously. In such cases, attempts have been made to adjust the travel speed of the welding head manually from time to time. This however, necessarily produces very considerably irregularities and fluctuations in the speed of the welding head relative to the work, which cannot readily be detected.

SUMMARY OF THE INVENTION

The invention is directed to a method and device with which the prior art difficulties can be eliminated and the once fixedly adjusted travel speed of the welding head relative to the work can be kept constant, irrespective of the absolute speed adjusted.

In accordance with the method of the invention, the travel speed of a welding head relative to a workpiece of an automatic welding machine is determined with the use of a rotatable member having an aperture therethrough which comprises drivingly engaging the rotatable member with the workpiece to rotate the rotatable member proportionally to the speed of welding advance, directing light from a light source to one side of the rotatable member in the area of the aperture to cause it to penetrate the aperture as the rotatable member is rotated, and sensing the light pulses transmitted through the aperture as a function of the traveling speed. The sensed information may be transmitted through an analog or digital indicator or through an amplifier which may in turn be used for controlling the speed.

Due to the direct pickup of the instantaneous speed of the welding head relative to the work or weld, effected through a frictional contact under pressure, and conversion of the disc speed into light pulses synchronous therewith, an absolutely reliable measure of the actual progress of welding is obtained. Upon comparing this measured speed with the speed adjusted on the automatic welding machine, the speed on the machine may continually be readjusted, manually or through a comparison circuit, to keep the desired relative travel speed between the weld and the welding head constant. None of the prior art methods makes it possible to reliably compare the constant travel speed adjusted on the automatic welding machine with the actual speed between the weld and the welding head, because they provide no possibility of determining the speed directly in the welding area.

With the invention preferably a glass fiber light is employed to transmit light from a light source to one side of the rotatable member and a similar glass fiber receiver receives the light pulses from the opposite side which are passed through the opening of the member and delivered to an indicator or amplifier for controlling the travel speed. The rotatable member is advantageously driven by gearing from a frictional rotatable wheel which engages directly on the workpiece. The frictional wheel may be spring loaded to be biased against the workpiece during operation. The light source is advantageously spaced apart from the welding area and the light is transmitted from the light source through fiber optics.

Since extraordinary high temperatures occur in the zone of the weld, the invention further provides to dispose the source of light, for example, a lamp, outside the hot region, at a certain distance from the welding zone, and to employ a glass fiber light guide or optical fiber for conducting the light beam to the light trasmitting apertures of the apertured disc.

In accordance with the invention there is provided a device for measuring traveling speed of a welding head which moves relative to a workpiece which comprises a rotatable member having an aperture therethrough through which light signals are passed and received by a sensor and a drive connection to the rotatable member which includes a frictional member engageable with the workpiece so that the light signals transmitted are proportional to the movement of the workpiece relative to the welding head.

A further object of the invention is to provide a method of measuring travel speed of a welding head relative to a workpiece using a rotatable member having an aperture therethrough which comprises drivingly engaging the rotatable member with the workpiece to rotate it proportionally to the speed of the working advance, directing light from a light source to the rotatable member in a location to cause it to penetrate the aperture as the rotatable member is rotated, and sensing the light pulses transmitted through the aperture as a function of the travel speed.

A further object of the invention is to provide a device for measuring traveling speed of welding heads relative to workpieces which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings

FIG. 3 is a sectional view of the device shown in FIG. 2;

FIG. 4 is a detail of the device shown in FIG. 3 but of another embodiment of the invention; and FIG. 5 is a top plan view of a spirally built-up surface on a circular base.

DESCRIPTION OF THE PREFERRED EMBODIMENTS

Figure 1:
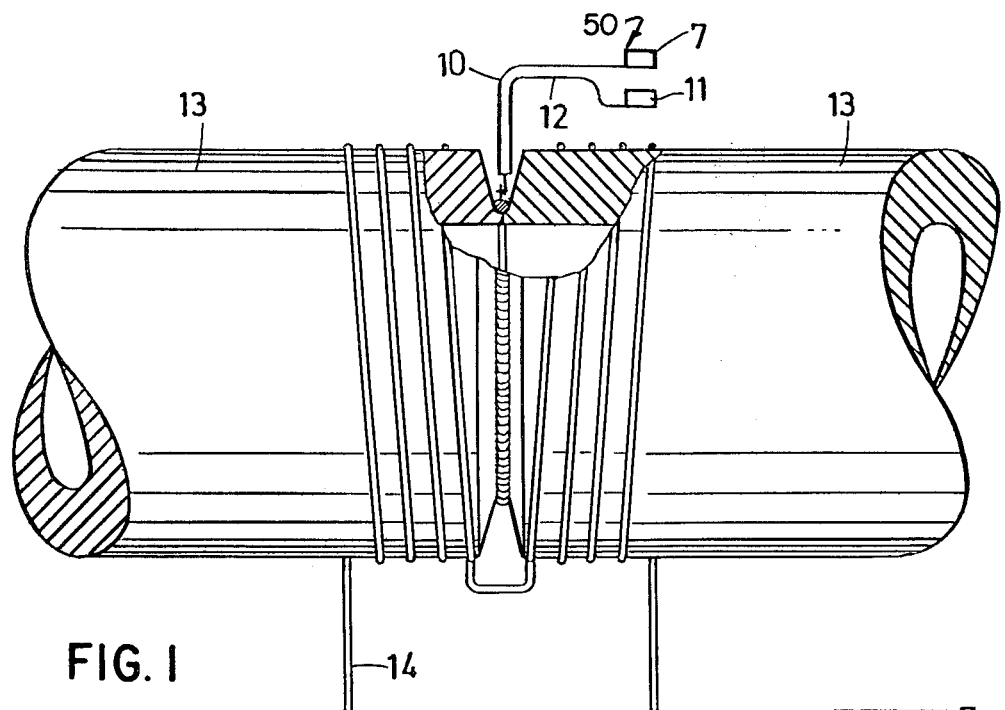
FIG. 1 is a side elevational view partly in section showing an automatic welding machine having a welding head in association with two shaft workpieces which are to be joined together in accordance with the method and apparatus of the invention.

Referring to the drawings in particular, the invention embodied therein in FIGS. 1 to 4 comprises an apparatus for measuring the traveling speed of the welding head 1 having an electrode 2 relative to a workpiece W which may for example comprise two shaft portions 13, 13 which are adapted to be joined together as shown in FIG. 1. The area of the welding of the shaft pieces is preheated by an induction coil 14.

In accordance with the invention, a device generally designated 50 for measuring the traveling speed includes a light source 7 for directing a light to a rotatable member 6 having an aperture 5 therethrough through which light is directed as the member rotates. The member 5 is drivingly connected to the workpiece so that it rotates at a speed proportionally thereto by a frictional wheel 4 which engages directly on the workpiece surface and which drives through gearing 8 and 9 to rotate the rotatable member 6.

As shown in FIG. 1, two abutting hollow shaft ends 13 are to be connected by a V-groove weld. The first circular bead is shown completed. The inventive device generally designated 50 is indicated at the top of the figure. Also indicated is an inductive winding 14 intended for preheating the welding area.

Figure 2:
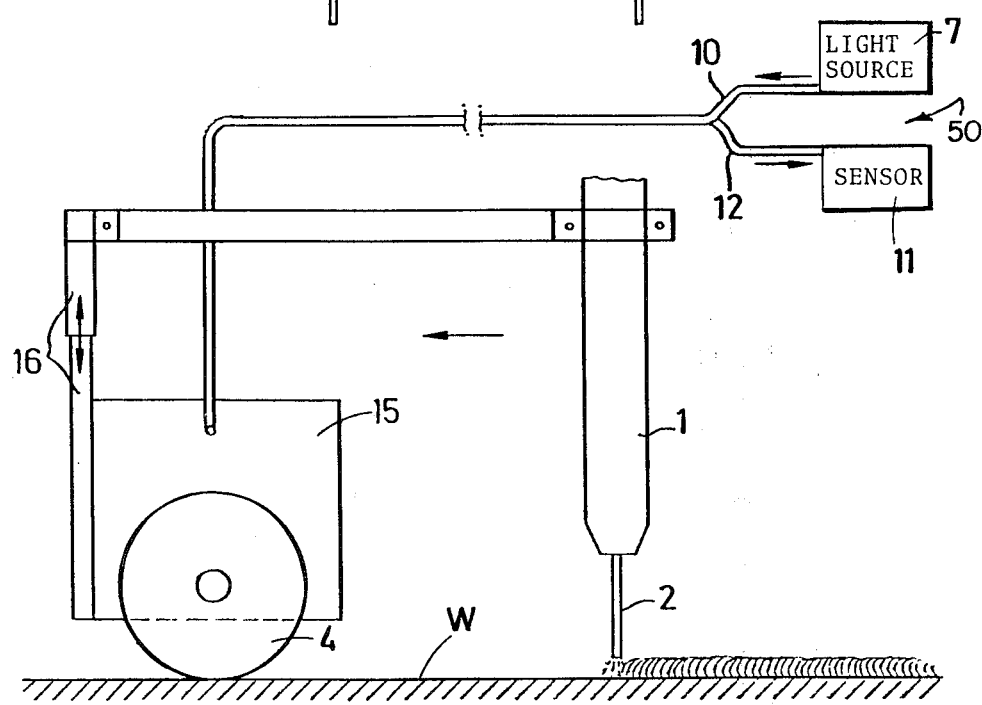
FIG. 2 is a side elevational view of the device shown in FIG. 1.

In FIG. 2, the welding head is shown at 1 with an electrode 2. A housing 15 for a transmission is connected to the welding head, and a workpiece driven friction wheel 4 is rotatably mounted on housing 15. A spring mechanism 16 (not shown in detail) urges wheel 4 against the workpiece W similar to the shaft ends 13 and 14.

As shown in FIG. 3, friction wheel 4 mounted on the housing 15 transmits its torque through gears 8, 9 to a disc 6 which is provided with apertures 5 permitting passage of light therethrough. The light is directed against apertures 5 from a light source 7 (FIG. 2) through a glass fiber light guide 10 and the produced light pulses return through a glass fiber light guide 12 to a sensor 11.

In a modified design shown in FIG. 4, the light beam and the produced light pulses are again conducted to and from disc 5 through glass fiber light guides 10, 12, only with the interposition of mirrors 16 provided in addition. This arrangement is space saving.

FIG. 5 shows an application of the invention to a surfacing process, in which a built-up surface is welded on a circular area by depositing a spirally extending weld bead 52.

While specific embodiments of the invention have been shown and described in detail to illustrate the application of the principles of the invention, it will be understood that the invention may be embodied otherwise without departing from such principles.

What is claimed is:

1. A device for determining the traveling speed of a workpiece and for welding the workpiece comprising:
   a welding head for welding the workpiece;
   a housing connected to and spaced from said welding head;
   a friction wheel rotatably mounted to said housing for engaging the workpiece and rotating the relative motion between said housing and the workpiece;
   a rotatable disk rotatably mounted in said housing and having at least one aperture therethrough, through which light passes as said disk rotates to produce a light signal;
   gear means in said housing connected between said disk and said wheel for rotating said disk with relative motion between said housing and the workpiece;
   a first fiber optic extending from one side of said housing to a remote location for receiving the light signal from said disk and transmitting it to the remote location;
   a second fiber optic extending from an opposite side of said housing to the remote location for transmitting light to the disk for forming the light signal;
   a light sensor connected to said first fiber optic and disposed at said remote location for sensing the light signal; and
   a light source connected to said second fiber optic and disposed at said remote location for producing light to form the light signal.

2. A device according to claim 1, including mirror means adjacent each side of said housing for deflecting light from said second fiber optic and to said first fiber optic through said aperture.

* * * * *